(12) United States Patent
Kummer et al.

(10) Patent No.: US 11,862,364 B2
(45) Date of Patent: Jan. 2, 2024

(54) COUPLED POWER AND CONTROL CABLE

(71) Applicant: Southwire Company, LLC, Carrollton, GA (US)

(72) Inventors: Randy D. Kummer, Villa Rica, GA (US); Scotty Joe Ledbetter, Bowdon, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 17/533,274

(22) Filed: Nov. 23, 2021

(65) Prior Publication Data

US 2022/0084722 A1 Mar. 17, 2022

Related U.S. Application Data

(63) Continuation of application No. 16/810,014, filed on Mar. 5, 2020, now Pat. No. 11,328,839, which is a continuation-in-part of application No. 16/697,831, filed on Nov. 27, 2019, now Pat. No. 10,930,412, which is a continuation of application No. 16/141,456, filed on Sep. 25, 2018, now Pat. No. 10,497,493.

(60) Provisional application No. 62/814,056, filed on Mar. 5, 2019, provisional application No. 62/563,168, filed on Sep. 26, 2017.

(51) Int. Cl.
*H01B 9/00* (2006.01)
*H02G 1/00* (2006.01)
*H05B 45/10* (2020.01)

(52) U.S. Cl.
CPC .............. *H01B 9/003* (2013.01); *H02G 1/00* (2013.01); *H05B 45/10* (2020.01)

(58) Field of Classification Search
CPC ........ H01B 9/003; H01B 7/0823; H01B 7/38; H02G 1/00; H05B 45/10
See application file for complete search history.

(56) References Cited

U.S. PATENT DOCUMENTS

| | | | |
|---|---|---|---|
| 3,715,458 | A | 2/1973 | Bayes et al. |
| 4,467,138 | A | 8/1984 | Brorein |
| 4,478,778 | A | 10/1984 | Look |
| 4,638,117 | A | 1/1987 | Ney |

(Continued)

FOREIGN PATENT DOCUMENTS

| | | |
|---|---|---|
| CN | 105355296 A | 2/2016 |
| EP | 0840331 A1 | 5/1998 |

OTHER PUBLICATIONS

Tsun-kit Chin and Dac Tran, Texas Instruments, "Combine power feed and data link via cable for remote peripherals," Nov. 10, 2011, EE Times Connecting the Global Electronics Community, 6 pgs.

*Primary Examiner* — Seokjin Kim
(74) *Attorney, Agent, or Firm* — Merchant & Gould P.C.

(57) ABSTRACT

Energy and a control signal may be provided using a coupled power and control cable. The coupled power and control cable may comprise a power cable, a control cable, and an overall jacket. The power cable may be connected between a switch and a fixture and may provide energy to the fixture from the switch. The control cable may be connected between the control circuit and the fixture and may provide the control signal to the fixture from the control circuit. The power cable and the control cable maybe disposed beneath the overall jacket.

20 Claims, 7 Drawing Sheets

(56) References Cited

U.S. PATENT DOCUMENTS

| | | | |
|---|---|---|---|
| 4,933,513 A | 6/1990 | Lee | |
| 5,053,583 A | 10/1991 | Miller et al. | |
| 5,342,991 A * | 8/1994 | Xu | H01B 9/003 |
| | | | 174/115 |
| 6,188,821 B1 | 2/2001 | McAlpine et al. | |
| 6,363,192 B1 | 3/2002 | Spooner | |
| 6,734,364 B2 | 5/2004 | Price et al. | |
| 6,998,538 B1 | 2/2006 | Fetterolf, Sr. et al. | |
| 7,049,523 B2 | 5/2006 | Shuman et al. | |
| 7,206,481 B2 | 4/2007 | Quinn et al. | |
| 7,672,556 B2 | 3/2010 | Keller | |
| 7,740,501 B2 | 6/2010 | Ballard et al. | |
| 8,466,365 B2 | 6/2013 | Gundel | |
| 8,492,655 B2 | 7/2013 | Gundel | |
| 8,658,899 B2 | 2/2014 | Gundel | |
| 8,658,900 B2 | 2/2014 | Picard et al. | |
| 8,841,554 B2 | 9/2014 | Gundel et al. | |
| 9,412,495 B1 * | 8/2016 | Bennett | H01B 7/185 |
| 9,679,681 B2 | 6/2017 | Faulkner et al. | |
| 10,497,493 B1 | 12/2019 | Kummer et al. | |
| 2005/0139378 A1 | 6/2005 | Carlson et al. | |
| 2005/0180725 A1 | 8/2005 | Carlson et al. | |
| 2010/0280677 A1 | 11/2010 | Budike, Jr. | |
| 2012/0145453 A1 | 6/2012 | Temple et al. | |
| 2015/0310964 A1 | 10/2015 | Larson et al. | |
| 2020/0287383 A1 | 9/2020 | David et al. | |

\* cited by examiner

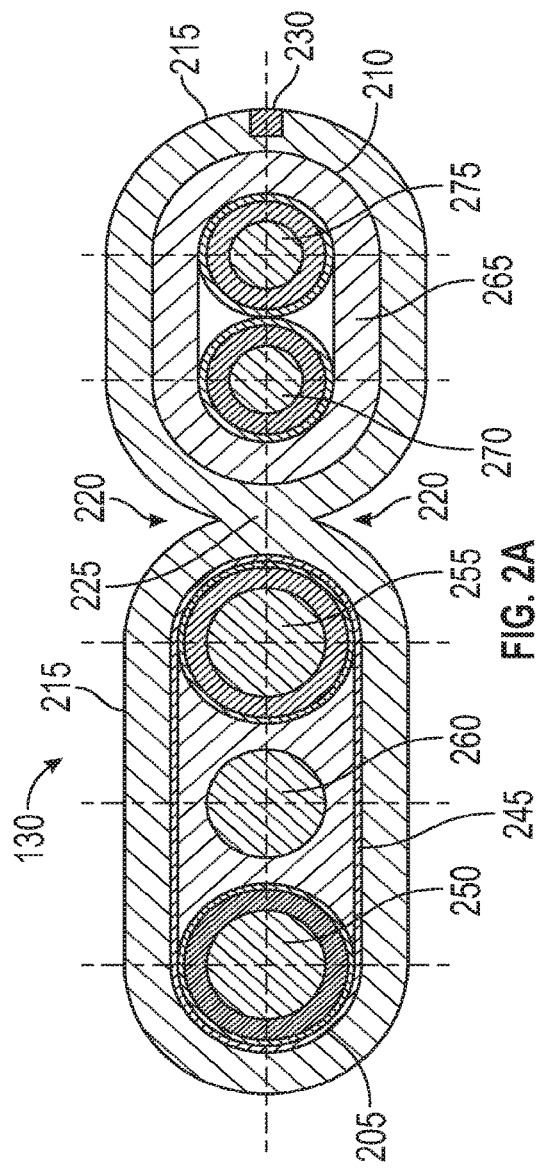
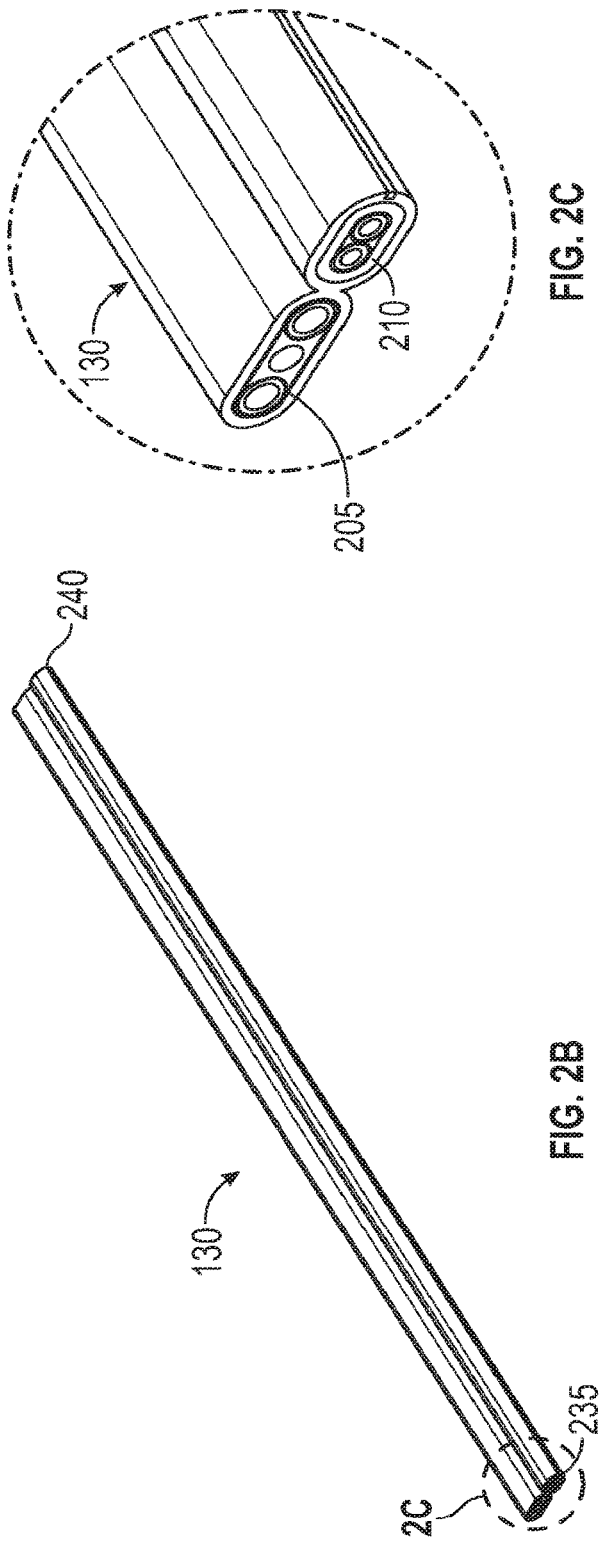

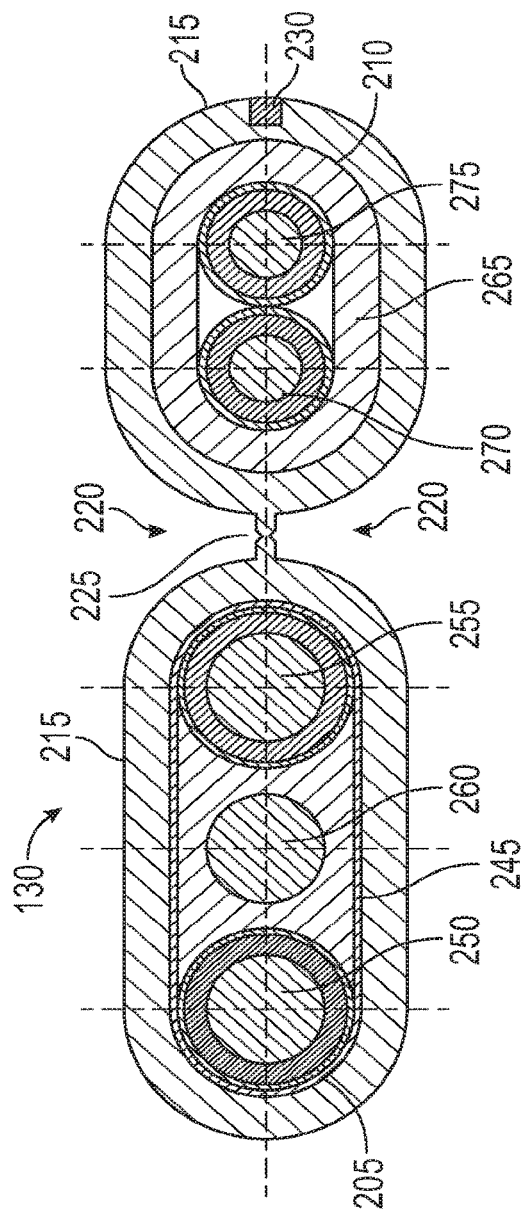
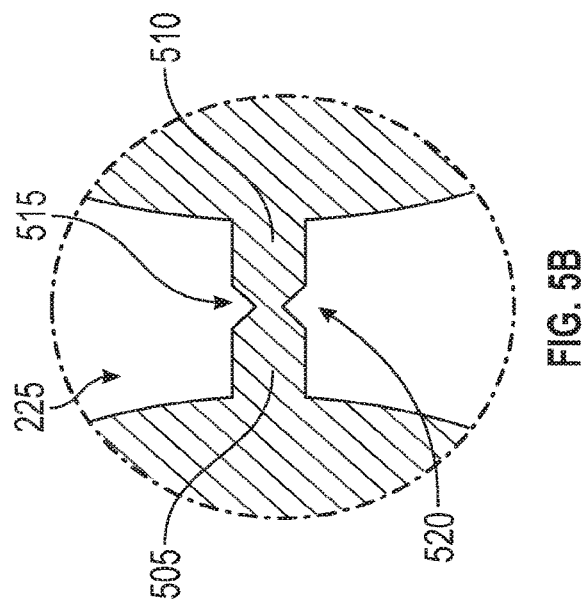
FIG. 5A
FIG. 5B

… … …

COUPLED POWER AND CONTROL CABLE

RELATED APPLICATIONS

This application is a continuation of co-pending U.S. patent application Ser. No. 16/810,014, filed Mar. 5, 2020, which claims the benefit of U.S. Provisional Application No. 62/814,056, filed Mar. 5, 2019, and is a continuation-in-part (CIP) of U.S. patent application Ser. No. 16/697,831, filed Nov. 27, 2019, now U.S. Pat. No. 10,930,412, which is a continuation of U.S. patent application Ser. No. 16/141,456, filed Sep. 25, 2018, now U.S. Pat. No. 10,497,493, which claims the benefit of U.S. Provisional Application No. 62/563,168, filed Sep. 26, 2017, all of which are incorporated herein by reference in their entirety.

BACKGROUND

A light-emitting diode (LED) lamp is an LED product that is assembled into a lamp (or light bulb) for use in lighting fixtures. LED lamps have a lifespan and electrical efficiency that are several times greater than incandescent lamps, and are significantly more efficient than most fluorescent lamps. The LED is one of today's most energy-efficient and rapidly-developing lighting technologies. Quality LED light bulbs last longer, are more durable, and offer comparable or better light quality than other types of lighting. LED is a highly energy efficient lighting technology, and has the potential to fundamentally change the future of lighting.

BRIEF DESCRIPTION OF THE FIGURES

The accompanying drawings, which are incorporated in and constitute apart of this disclosure, illustrate various embodiments of the present disclosure. In the drawings:

FIGS. 2A, 2B, and 2C show a coupled cable;

FIGS. 5A and 5B show a coupled cable;

DETAILED DESCRIPTION

Overview

Figure 1:
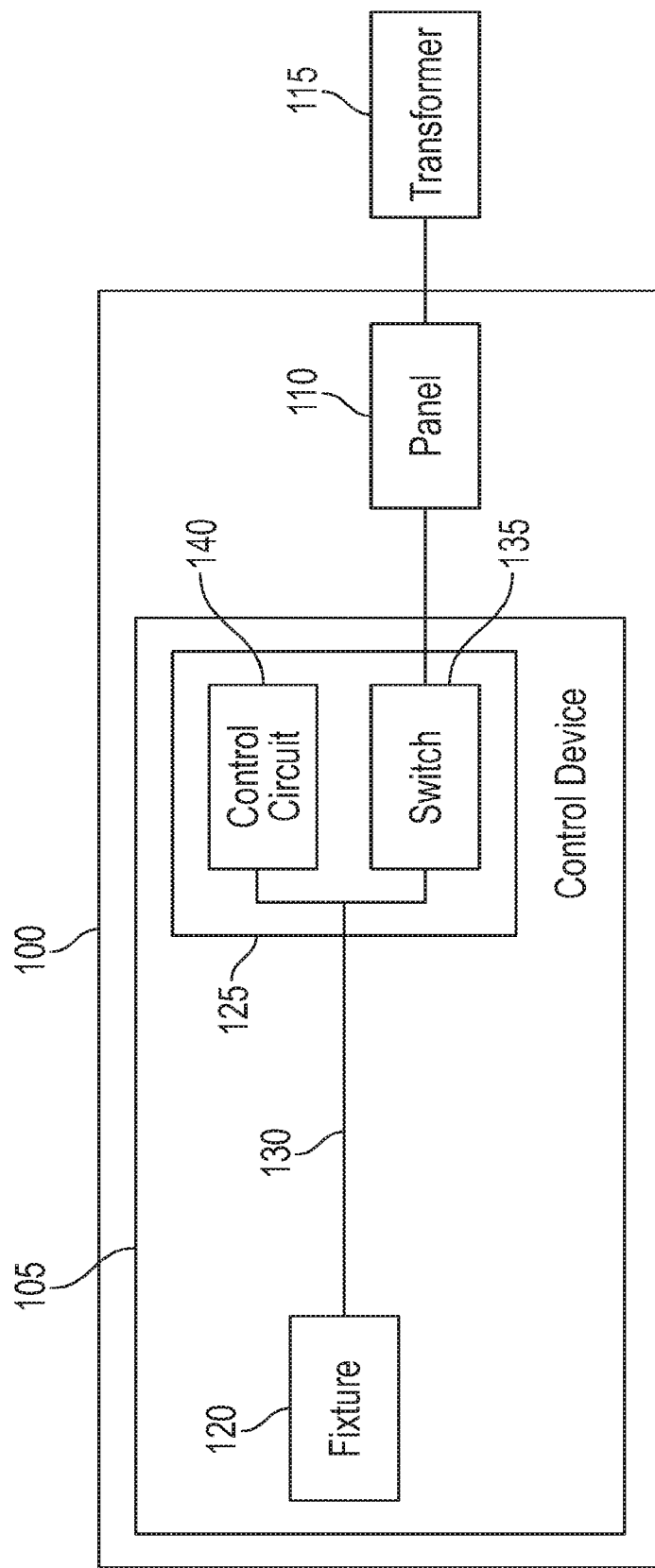
FIG. 1 shows an operating environment for a coupled cable.

Energy and a control signal may be provided using a coupled power and control cable. The coupled power and control cable may comprise a power cable, a control cable, and an overall jacket. The power cable may be connected between a switch and a fixture and may provide energy to the fixture from the switch. The control cable may be connected between the control circuit and the fixture and may provide the control signal to the fixture from the control circuit. The power cable and the control cable may be disposed beneath the overall jacket.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 shows an operating environment 100 for a coupled cable. As shown in FIG. 1, operating environment 100 may include a system 105 for providing energy and a control signal using a coupled power and control cable. Operating environment 100 may comprise, but is not limited to, a home, a business, a commercial space, an industrial space, or any similar area. Operating environment 100 may comprise an electrical panel 110 fed by a transformer 115. Electrical panel 110 may include circuit breakers used to feed circuits out of electrical panel 110. Once such circuit may be used to feed system 105. Transformer 115 may be operated by an electric utility entity and may step voltage down from a level used by the electric utility entity to a level usable by operating environment 100.

System 105 may comprise a fixture 120 connected to a control device 125 via a coupled cable 130. Control device 125 may comprise a switch 135 and a control circuit 140. Electrical energy may be fed to control device 125 from panel 110. Fixture 120 may comprise any type device that consumes energy and can be controlled. For example, fixture 120 may comprise, but is not limited to, a light such as a Light Emitting Diode (LED) light or a florescent light. Switch 135 may be configured to interrupt the supply of electrical energy to fixture 120. For example, when switch 135 is closed, electrical energy may be supplied to control device 125 and fixture 120 from electrical panel 110. However, when switch 135 is open, the electrical energy supplied to control device 125 and fixture 120 from electrical panel 110 may be interrupted.

Control circuit 140 may comprise any device used to control fixture 120. For example, when fixture 120 comprises a light such as an LED light, control circuit 140 may comprise, but is not limited to, a dimmer for the LED light. The dimmer may comprise, for example, a potentiometer and may be configured to supply a control signal that may comprise a voltage signal between 0V and 10V. As the voltage of the control signal from control circuit 140 changes (e.g., increases), the LED light may supply a corresponding change (e.g., higher light intensity) in response.

FIGS. 2A, 2B, and 2C show coupled cable 130 in more detail. As shown in FIG. 2A, coupled cable 130 may comprise a power cable 205, a control cable 210, and an overall jacket 215. Overall jacket 215 may comprise complementary valleys 220, a connector portion 225, and a stripe 230. As shown in FIG. 2B, coupled cable 130 may have a first end 235 and a second end 240.

Power cable 205 may comprise a power cable jacket 245, a power cable first conductor 250, a power cable second conductor 255, and a power cable ground wire 260. Power cable 205 may comprise a non-metallic (NM) sheathed cable that maybe used, for example, for both exposed and concealed work in normally dry locations at temperatures not to exceed 90° C. (with ampacity limited to that for 60° C. conductors) as specified in the National Electrical Code (NEC). Power cable 205 may comprise a Class 1 remote-control and signaling circuit cable as defined by the NEC. Class 1 cables typically operate at 120V, but the NEC permits them to operate at up to 600V.

Power cable first conductor 250 may comprise, but is not limited to, American Wire Gage (AWG) 12 Thermoplastic High Heat-resistant Nylon-coated (THHN) copper wire with black insulation. Power cable second conductor 255 may comprise, but is not limited to, AWG 12 THHN copper wire with white insulation. And power cable ground wire 260 may comprise, but is not limited to, an AWG 12 bare copper wire. Paper fillers may be placed inside power cable jacket 245 between power cable first conductor 250, power cable second conductor 255, and power cable ground wire 260. The aforementioned wires are not limited to solid copper and may be stranded or may comprise any conductive metal or non-metal material.

Control cable 210 may comprise a control cable jacket 265, a control cable first conductor 270, and a control cable second conductor 275. Control cable 210 may not include a ground wire. Control cable first conductor 270 may comprise, but is not limited to, an AWG 16 TFN copper wire with grey insulation. Control cable second conductor 275 may comprise, but is not limited to, an AWG 16 TFN copper wire with purple insulation. The aforementioned wires are not limited to solid copper and may be stranded or may comprise any conductive metal or non-metal material.

Control cable 210 may comprise a Class 1 remote-control and signaling circuit cable as defined by the NEC. Class 1 cables typically operate at 120V, but the NEC permits them to operate at up to 600V. Although control cable 210 may only be operated within Class 2 voltage and current level limits, control cable 210 may be insulated and otherwise comprise a Class 1 cable. For example, Class 2 circuits typically include wiring for low-energy (100VA or less), low-voltage (under 30V) loads such as low-voltage lighting, thermostats, PLCs, security systems, and limited-energy voice, intercom, sound, and public address systems. Class 2 circuits may protect against electrical fires by limiting the power to 100VA for circuits that operate at 30V or less, and 0.5VA for circuits between 30V and 150V. Electric shock may be protected against by limiting the current of the circuit to 5 mA or less for circuits between 30V and 150V.

Overall jacket 215 may cover both power cable 205 and control cable 210. As stated above, power cable 205 may comprise an NEC Class 1 cable. Because power cable 205 and control cable 210 are included under the same overall jacket 215, control cable 210 may also comprise an NEC Class 1 cable even though control cable 210 may only be operated within NEC Class 2 voltage and current level limits.

Coupled cable 130 may include power cable 205 and control cable 210 in a side-by-side configuration. For example, as shown in FIG. 2A, an axis may pass through the conductors of both power cable 205 and control cable 210. In addition, overall jacket 215 may comprise complementary valleys 220 and connector portion 225 that may aid in tearing power cable 205 and control cable 210 apart. For example, an operator may grasp power cable 205 with the fingers of one hand and grasp control cable 210 with the fingers of the other hand and pull the two apart along connector portion 225. Stripe 230 may be included in overall jacket 215 to indicate (e.g., to an operator) which side of coupled cable 130 may comprise power cable 205 and which side may comprise control cable 210. The example shown in FIG. 2A shows stripe 230 on control cable 210 side of coupled cable 130, however it may be included on power cable 205 side of coupled cable 130 instead. Notwithstanding, an indicator may be used with embodiments of the disclosure to indicate which side of coupled cable 130 includes power cable 205 and which side includes control cable 210.

Figure 3:
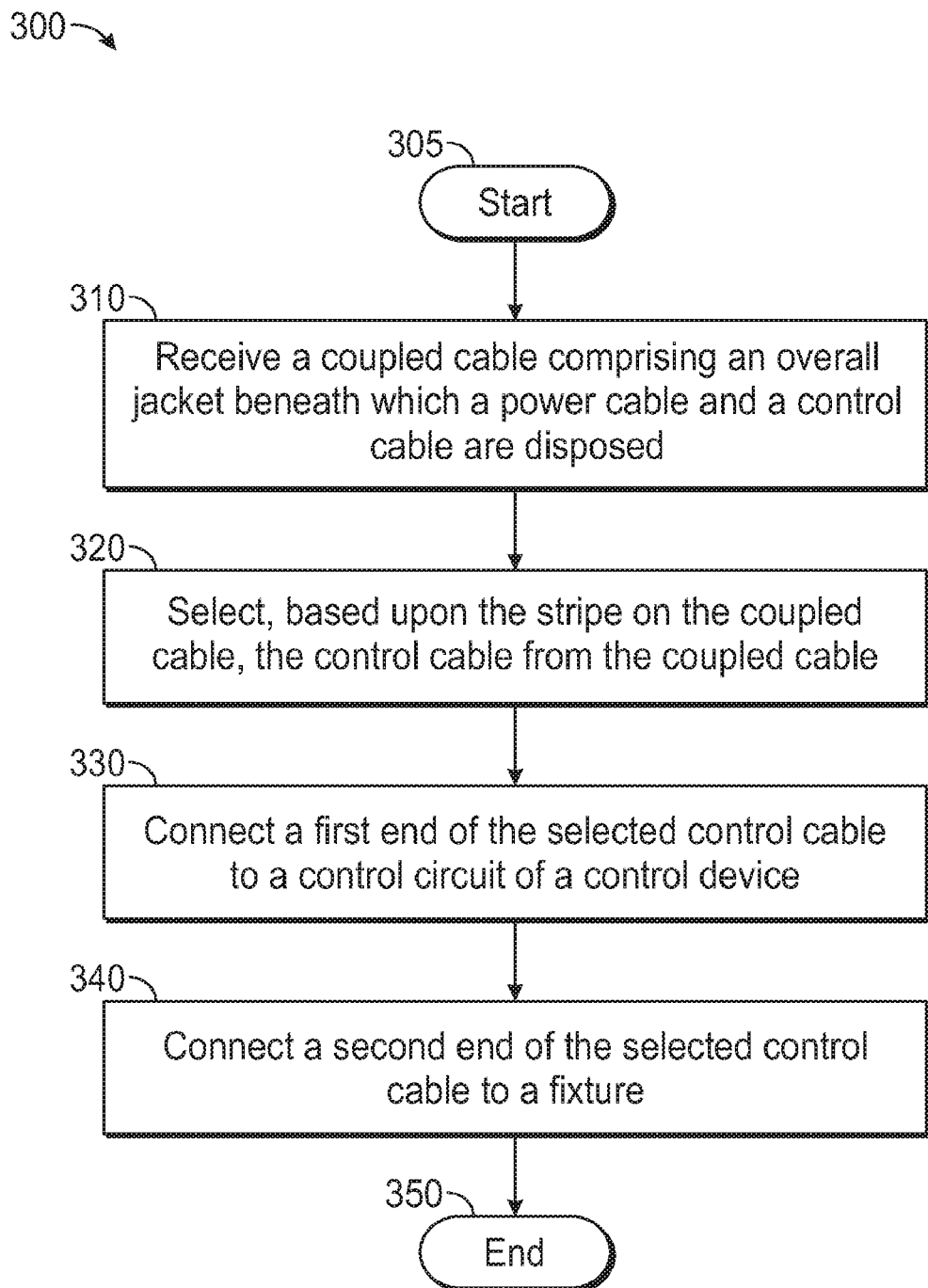
FIG. 3 is a flow chart of a method for providing a coupled power and control cable system.

FIG. 3 is a flow chart setting forth the general stages involved in a method 300 consistent with embodiments of the disclosure for providing a coupled power and control cable system. Method 300 may be implemented using coupled cable 130 as described in more detail above with respect to FIG. 1 and FIGS. 2A, 2B, and 2C. Ways to implement the stages of method 300 will be described in greater detail below.

Method 300 may begin at starting block 305 and proceed to stage 310 where coupled cable 130 may be received by an operator. For example, as described above, coupled cable 130 may comprise overall jacket 215 beneath which power cable 205 and a control cable 210 are disposed. Overall jacket may comprise complementary valleys 220 and connector portion 225 disposed between power cable 205 and control cable 210. Overall jacket may have a stripe on a portion of overall jacket 215 under which control cable 210 is disposed. Power cable 205 may be Class 1 and control cable 210 may be Class 1. Although control cable 210 may only be operated within Class 2 voltage and current level limits, control cable 210 may be insulated and otherwise comprise a Class 1 cable because overall jacket 215 may cover both power cable 205 and control cable 210.

From stage 310, where coupled cable 130 is received by the operator, method 300 may advance to stage 320 where the operator may select, based upon stripe 230 on coupled cable 130, control cable 210 from coupled cable 130. Stripe 230 may be included in overall jacket 215 to indicate to the operator which side of coupled cable 130 may comprise power cable 205 and which side may comprise control cable 210. The example shown in FIG. 2A shows stripe 230 on control cable 210 side of coupled cable 130, however it may be included on power cable 205 side of coupled cable 130 instead. Notwithstanding, an indicator may be used with embodiments of the disclosure to indicate which side of coupled cable 130 includes power cable 205 and which side includes control cable 210.

Once the operator selects, based upon stripe 230 on coupled cable 130, control cable 210 from coupled cable 130 in stage 320, method 300 may continue to stage 330 where the operator may connect first end 235 of selected control cable 210 to control circuit 140 of control device 125. For example, the operator may grasp power cable 205 with the fingers of one hand and grasp control cable 210 with the fingers of the other hand and pull the two apart along connector portion 225 for a small length of coupled cable 130 at first end 235. The operator may then connect the separated power cable 205 at first end 235 to switch 135 and the separated control cable 210 at first end 235 to control circuit 140.

After the operator connects first end 235 of selected control cable 210 to control circuit 140 of control device 125 in stage 330, method 300 may proceed to stage 340 where the operator may connect second end 240 of selected control cable 210 to fixture 120. For example, the operator may grasp power cable 205 with the fingers of one hand and grasp control cable 210 with the fingers of the other hand and pull the two apart along connector portion 225 for a small length of coupled cable 130 at second end 240. The operator may then connect the separated power cable 205 at second end 240 to fixture 120 and the separated control cable 210 at second end 240 to fixture 120.

Prior to connecting first end 235 of coupled cable 130 to control device 125 or connecting second end 240 of coupled cable 130 to fixture 120, the operator may first pull coupled cable 130 in system 105 between fixture 120 and control device 125. Because overall jacket 215 may cover both power cable 205 and control cable 210, the cable pull is simplified because only one cable (i.e., coupled cable 130) need be pulled between fixture 120 and control device 125. With conventional systems, two cables rather than one would need to be pulled. Embodiments of the disclosure provide an improvement by simplifying this cable pull. Furthermore, because power cable 205 and control cable 210 are under the same overall jacket 215, there may be no confusion to the operator as to which power cable corresponds to which control cable when multiple fixtures and multiple control devices are employed in system 105 because corresponding power cables and control cables are attached to one another. Once operator connects second end 240 of selected control cable 210 to fixture 120 in stage 340, method 300 may then end at stage 350.

Figure 4:
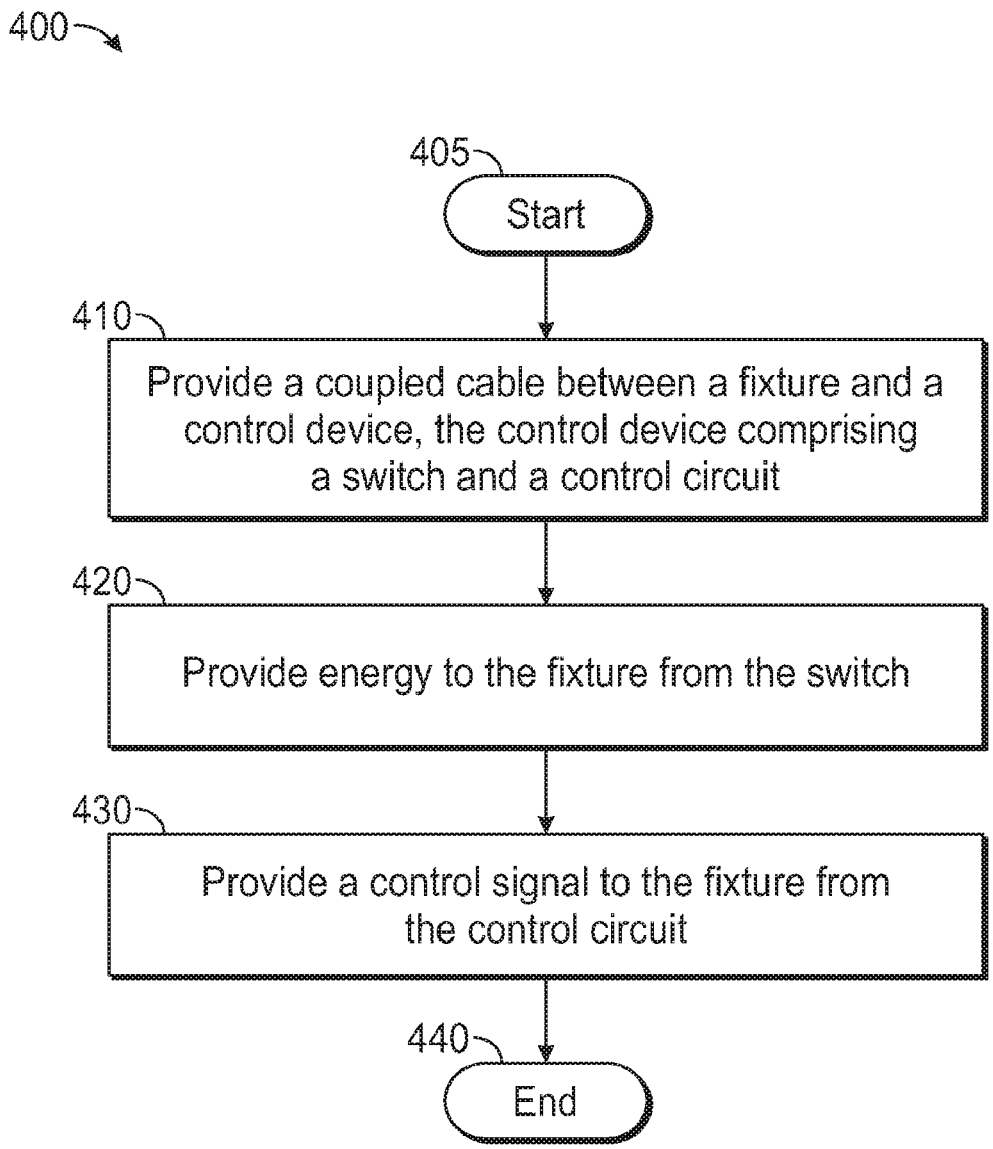
FIG. 4 is a flow chart of a method for providing service using a coupled power and control cable system.

FIG. 4 is a flow chart setting forth the general stages involved in a method 400 consistent with embodiments of the disclosure for providing service using a coupled power and control cable system. Method 400 may be implemented using coupled cable 130 as described in more detail below with respect to FIG. 1 and FIGS. 2A, 2B, and 2C. Ways to implement the stages of method 400 will be described in greater detail below.

Method 400 may begin at starting block 405 and proceed to stage 410 where coupled cable 130 may be provided between fixture 120 and control device 125. Control device 125 may comprise switch 135 and control circuit 140. For example, electrical energy may be fed to control device 125 from panel 110.

From stage 410, where coupled cable 130 may be provided between fixture 120 and control device 125, method 400 may advance to stage 420 where energy may be provided to fixture 120 from switch 135. For example, switch 135 maybe configured to interrupt the supply of electrical energy to fixture 120. When switch 135 is closed, for example, energy may be supplied to control device 125 and fixture 120 from electrical panel 110. However, when switch 135 is open, the energy supplied to control device 125 and fixture 120 from electrical panel 110 may be interrupted.

After energy is provided to fixture 120 from switch 135 in stage 420, method 400 may proceed to stage 430 where a control signal may be provided to fixture 120 from control circuit 140. The control signal may comprise a voltage level between a first voltage value and a second voltage value. The voltage level may not exceed a maximum value corresponding to Class 2. For example, control circuit 140 may comprise any device used to control fixture 120. When fixture 120 comprises an LED light, for example, control circuit 140 may comprise a dimmer for the LED light. The dimmer may comprise a potentiometer and may be configured to supply a control signal that may comprise a voltage signal between 0V (e.g., first voltage value) and 10V (second voltage value). As the voltage of the control signal increases, the LED light may supply a corresponding higher light intensity. Power cable 205 may be Class 1 and control cable 210 may be Class 1. Although control cable 210 may only be operated within Class 2 voltage and current level limits, control cable 210 may be insulated and otherwise comprise a Class 1 cable. Once control signal is provided to fixture 120 from control circuit 140 in stage 430, method 400 may then end at stage 440.

FIGS. 5A and 5B show a coupled cable 130 similar to that shown in FIGS. 2A, 2B, and 2C. As shown in FIG. 5A, coupled cable 130 may include power cable 205 and control cable 210 in a side-by-side configuration. For example, as shown in FIG. 5A, an axis may pass through the conductors of both power cable 205 and control cable 210. In addition, overall jacket 215 may comprise complementary valleys 220 and connector portion 225 that may aid in tearing power cable 205 and control cable 210 apart. For example, an operator may grasp power cable 205 with the fingers of one hand and grasp control cable 210 with the fingers of the other hand and pull the two apart along connector portion 225.

FIG. 5B shows connector portion 225 in greater detail. As shown in FIG. 5B, connector portion 225 may comprise a webbing disposed within overall jacket 215. The webbing may comprise a webbing first portion 505 protruding from overall jacket 215 on the power cable 205 side of coupled cable 130 and a webbing second portion 510 protruding from overall jacket 215 on the control cable 210 side of coupled cable 130. A first webbing valley 515 and an opposing second webbing valley 520 may be disposed between webbing first portion 505 and webbing second portion 510. First webbing valley 515 and second webbing valley 520 may be "V" shaped. Notwithstanding, first webbing valley 515 and second webbing valley 520 may comprise any shape. As stated above, an operator may grasp power cable 205 with the fingers of one hand and grasp control cable 210 with the fingers of the other hand and pull (e.g., tear) the two apart along connector portion 225.

Connector portion 225, comprising the webbing that may include first webbing valley 515 and opposing second webbing valley 520, may aid in this pulling or tearing apart of connector portion 225. For example, power cable 205 and control cable 210 may separate along the opposing first webbing valley 515 and second webbing valley 520 during the pulling and tearing process. Accordingly, the opposing first webbing valley 515 and second webbing valley 520 may facility in separating power cable 205 and control cable 210.

Figure 6:
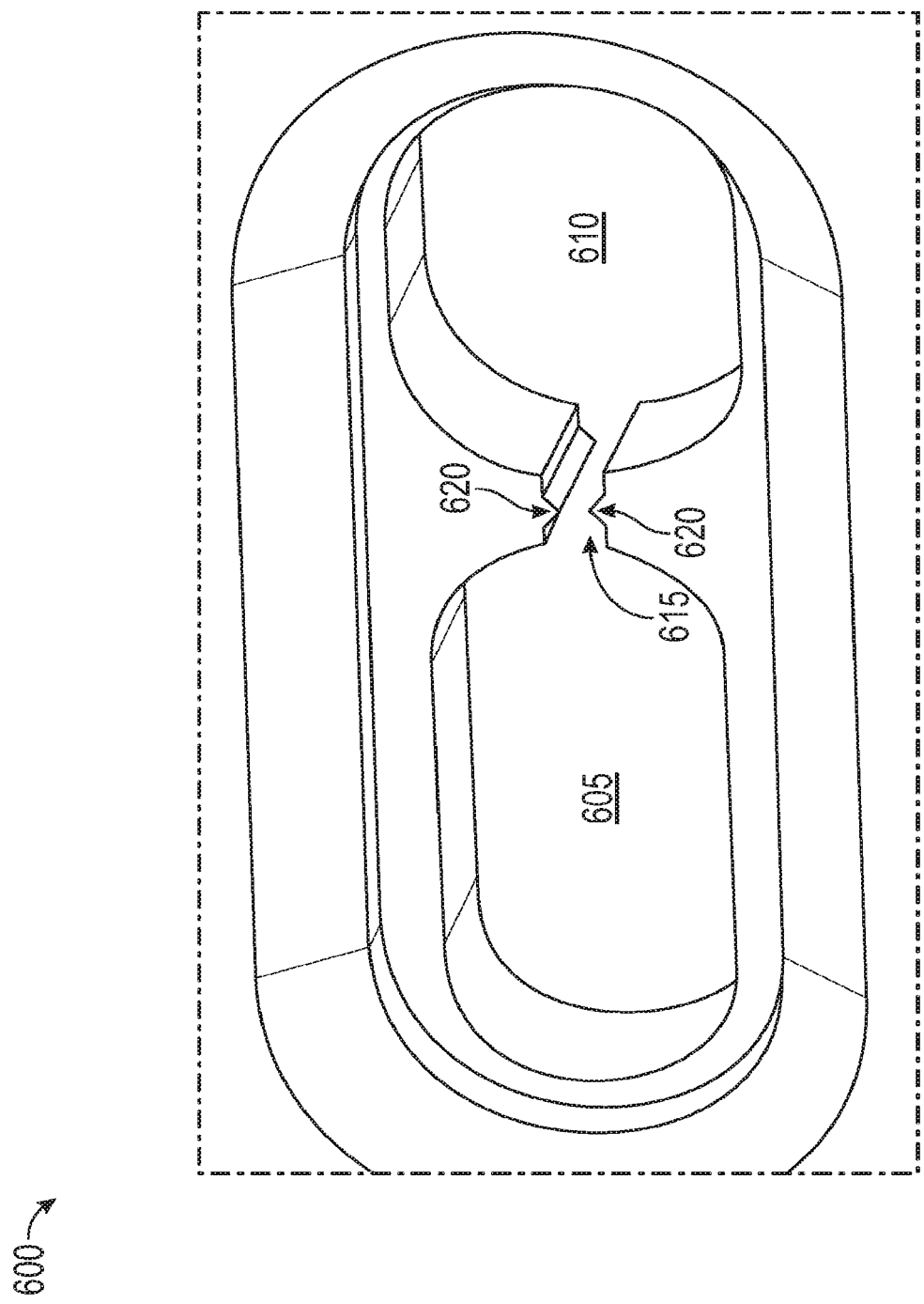
FIG. 6 shows a die.

FIG. 6 shows a die 600 that may be used in making coupled cable 130 consistent with embodiments of the disclosure. As shown in FIG. 6, die 600 may comprise a first section 605, a second section 610, and an intermediate section 615. Intermediate section 615 may comprise tips 620 protruding into a gap in die 600 between first section 605 and second section 610.

Die 600 may be used in an extrusion process for manufacturing coupled cable 130. During manufacturing, coupled cable 130 may pass through die 600. Power cable 205 portion of coupled cable 130 may pass through first section 605 of die 600 and control cable 210 of coupled cable 130 may pass through second section 610 of die 600. Intermediate section 615 of die 600 may be disposed between first section 605 and second section 610 and may form connector portion 225 comprising the webbing as described above with respect to FIG. 5A and FIG. 5B during manufacturing coupled cable 130. Intermediate section 615 may include tips 620 that may form opposing first webbing valley 515 and second webbing valley 520 in connector portion 225 of coupled cable 130.

Figure 7:
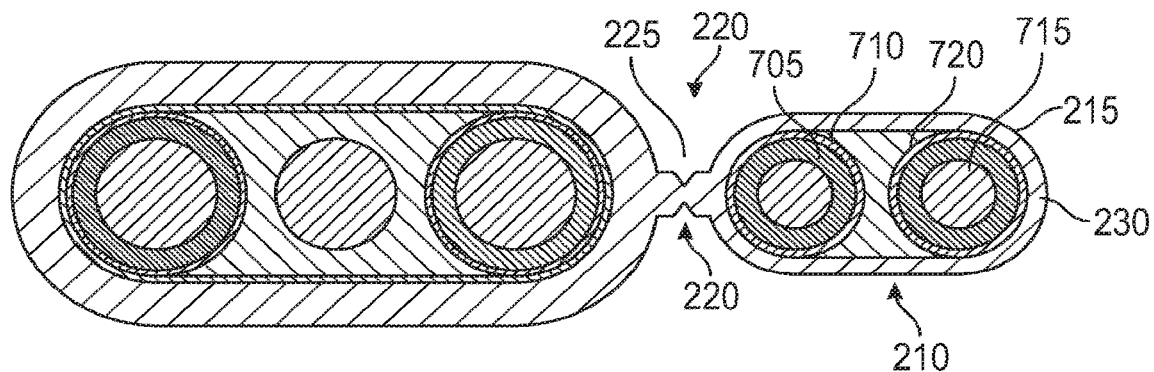
FIG. 7 shows a coupled cable.

FIG. 7 shows coupled cable 130 similar to that shown in FIGS. 2A, 2B, 2C, 5A, and 5B. As shown in FIG. 7, coupled cable 130 may include power cable 205 and control cable 210 in a side-by-side configuration. In contrast with the embodiments of FIGS. 2A, 2B, 2C, 5A, and 5B, control cable 210 of FIG. 7 may comprise optical fibers. For example, control cable 210 of FIG. 7 may comprise a first fiber 705 having a first fiber jacket 710. Similarly, control cable 210 of FIG. 7 may comprise a second fiber 715 having a second fiber jacket 720. First fiber jacket 710 and second fiber jacket 720 may, for example, may provide additional mechanical strength and protection to first fiber 705 and second fiber 715 respectively.

As with the embodiments shown in FIG. 5A and FIG. 5B, overall jacket 215 of FIG. 7 may comprise complementary valleys 220 and connector portion 225 that may aid in tearing power cable 205 and control cable 210 apart. For example, an operator may grasp power cable 205 with the fingers of one hand and grasp control cable 210 with the fingers of the other hand and pull the two apart along connector portion 225. Connector portion 225 of FIG. 7 may be similar to connector portion 225 shown in FIG. 5B as described above.

Overall jacket 215 may cover both power cable 205 and control cable 210. As stated above, power cable 205 may comprise an NEC Class 1 cable. The coupled cable 130 of FIG. 7 may be used with the processes described above with respect to FIG. 3 and FIG. 4. With the coupled cable 130 of FIG. 7, the control signal may be sent as an optical signal over control cable 210. Furthermore, fixture 120 may comprise or further include a WiFi Access Point (AP). Control cable 210 of FIG. 7 may be used to send and receive data signals to and from the AP.

Figure 8:
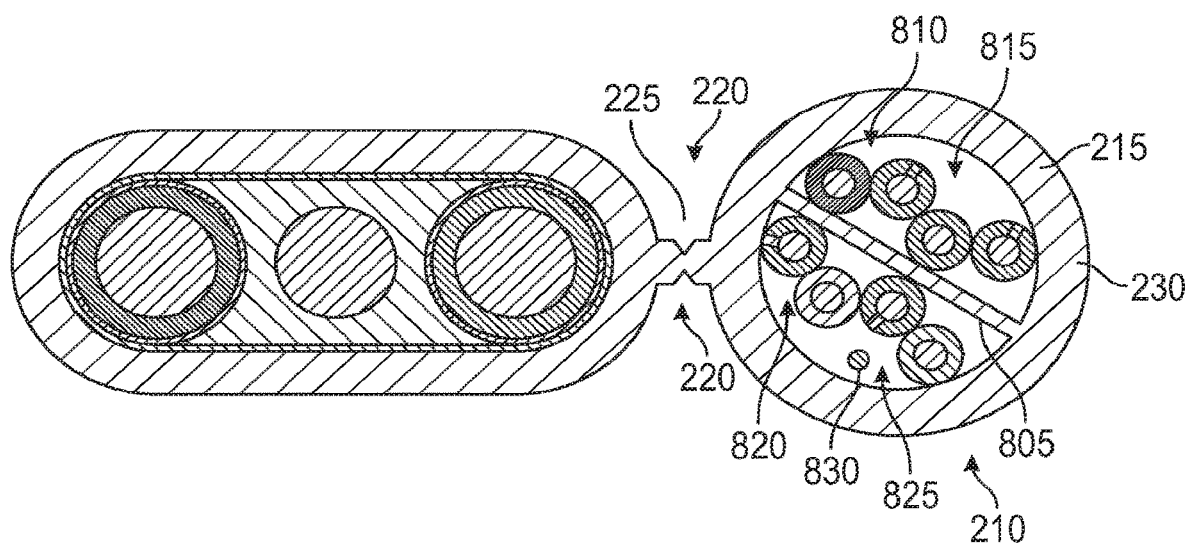
FIG. 8 shows a coupled cable.

FIG. 8 shows coupled cable 130 similar to that shown in FIGS. 2A, 2B, 2C, 5A, and 5B. As shown in FIG. 8, coupled cable 130 may include power cable 205 and control cable 210 in a side-by-side configuration. In contrast with the embodiments of FIGS. 2A, 2B, 2C, 5A, and 5B, control cable 210 of FIG. 8 may comprise a plurality of twisted pair. For example, control cable 210 of FIG. 8 may comprise a partition 805 that may separate an interior of control cable 210 into a plurality of compartments.

As shown in FIG. 8, a first compartment may include a first twisted pair 810 and a second twisted pair 815. Similarly, a second compartment may include a third twisted pair 820 and a fourth twisted pair 825. While FIG. 8 shows four twisted pair, embodiments of the disclosure are not so limited and may include any number of twisted pair. Furthermore, embodiments of the disclosure may include any number of partitions and compartments. For example, embodiments of the disclosure may include four compartments where each of the plurality of twisted pair is included in a separate compartment.

Furthermore, control cable 210 of FIG. 8 may comprise a ripcord 830. When installing coupled cable 130, ripcord may be pulled in order to open the compartments and gain access to the plurality of twisted pair. Each of the conductors in the plurality of twisted pair may also include a color stripe that may be used to identify a particular twisted pair or individual conductors within a twisted pair.

As with the embodiments shown in FIG. 5A and FIG. 5B, overall jacket 215 of FIG. 8 may comprise complementary valleys 220 and connector portion 225 that may aid in tearing power cable 205 and control cable 210 apart. For example, an operator may grasp power cable 205 with the fingers of one hand and grasp control cable 210 with the fingers of the other hand and pull the two apart along connector portion 225. Connector portion 225 of FIG. 8 may be similar to connector portion 225 shown in FIG. 5B as described above.

Overall jacket 215 may cover both power cable 205 and control cable 210. As stated above, power cable 205 may comprise an NEC Class 1 cable. Because power cable 205 and control cable 210 are included under the same overall jacket 215, control cable 210 may also comprise an NEC Class 1 cable even though control cable 210 may only be operated within NEC Class 2 voltage and current level limits.

The coupled cable 130 of FIG. 8 may be used with the processes described above with respect to FIG. 3 and FIG. 4. With the coupled cable 130 of FIG. 8, the control signal may be sent as an electrical signal over one or more of the plurality of twisted pair of control cable 210.

Furthermore, fixture 120 may comprise or further include a WiFi Access Point (AP). Control cable 210 of FIG. 8 may be used to send and receive data signals to and from the AP. The plurality of twisted pair of control cable 210 may provide Power-over-Ethernet (POE). As such, one or more of the plurality of twisted pair of control cable 210 may be used to provide both power and data to the AP.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
a power cable first conductor;
a power cable second conductor;
a power cable ground wire disposed between the power cable first conductor and the power cable second conductor;
a first jacket under which the power cable first conductor, the power cable second conductor, and the power cable ground wire are disposed;
a control cable first conductor;
a control cable second conductor;
a second jacket under which the control cable first conductor and the control cable second conductor are disposed, wherein the first jacket and the second jacket are connected through an overall jacket, and wherein the overall jacket comprises a stripe indicating which side of the coupled cable comprises power cable and which side of the coupled cable comprises the control cable.

2. The system of claim 1, wherein the power cable first conductor is insulated.

3. The system of claim 1, wherein the power cable second conductor is insulated.

4. The system of claim 1, wherein the control cable first conductor and the control cable second conductor are adjacent.

5. The system of claim 1, wherein the first jacket and the second jacket comprise an overall jacket.

6. The system of claim 1, wherein the first jacket and the second jacket are connected at a connection portion.

7. The system of claim 1, wherein the first jacket and the second jacket are connected at a connection portion of the overall jacket comprising the first jacket and the second jacket.

8. The system of claim 1, wherein the first jacket and the second jacket are connected by a webbing.

9. The system of claim 1, wherein the first jacket and the second jacket are connected by a webbing of the overall jacket comprising the first jacket, the second jacket, and the webbing.

10. The system of claim 1, wherein the power cable first conductor, the power cable second conductor, and the power cable ground wire comprise a power cable.

11. The system of claim 10, wherein the power cable comprise a National Electrical Code (NEC) Class 1 cable.

12. The system of claim 1, wherein the control cable first conductor and the control cable second conductor comprise a control cable.

13. The system of claim 12, wherein the control cable comprise a National Electrical Code (NEC) Class 1 cable.

14. A system comprising:
a power cable first conductor, wherein the power cable first conductor is insulated;
a power cable second conductor, wherein the power cable second conductor is insulated;
a power cable ground wire disposed between the power cable first conductor and the power cable second conductor;
a first jacket under which the power cable first conductor, the power cable second conductor, and the power cable ground wire are disposed;
a control cable first conductor, wherein the control cable first conductor is insulated;
a control cable second conductor, wherein the control cable second conductor is insulated and wherein the control cable first conductor and the control cable second conductor are adjacent;
a second jacket under which the control cable first conductor and the control cable second conductor are disposed, wherein the first jacket and the second jacket are connected through an overall jacket, and wherein the overall jacket comprises a stripe indicating which side of the coupled cable comprises power cable and which side of the coupled cable comprises the control cable.

15. The system of claim 14, wherein the first jacket and the second jacket comprise an overall jacket.

16. The system of claim 14, wherein the first jacket and the second jacket are connected at a connection portion.

17. The system of claim 14, wherein the first jacket and the second jacket are connected at a connection portion of the overall jacket comprising the first jacket and the second jacket.

18. The system of claim 14, wherein the first jacket and the second jacket are connected by a webbing.

19. The system of claim 14, wherein the first jacket and the second jacket are connected by a webbing of the overall jacket comprising the first jacket, the second jacket, and the webbing.

20. A system comprising:
a power cable comprising an National Electrical Code (NEC) Class 1 cable, wherein the power cable comprising;
a power cable first conductor,
a power cable second conductor, and
a power cable ground wire disposed between the power cable first conductor and the power cable second conductor;
a first jacket under which the power cable is disposed;
a control cable comprising an NEC Class 1 cable, wherein the control cable comprising;
a control cable first conductor,
a control cable second conductor; and
a second jacket under which the control cable is disposed, wherein the first jacket and the second jacket are connected through an overall jacket, and wherein the overall jacket comprises a stripe indicating which side of the coupled cable comprises power cable and which side of the coupled cable comprises the control cable.

* * * * *